Figure 5:
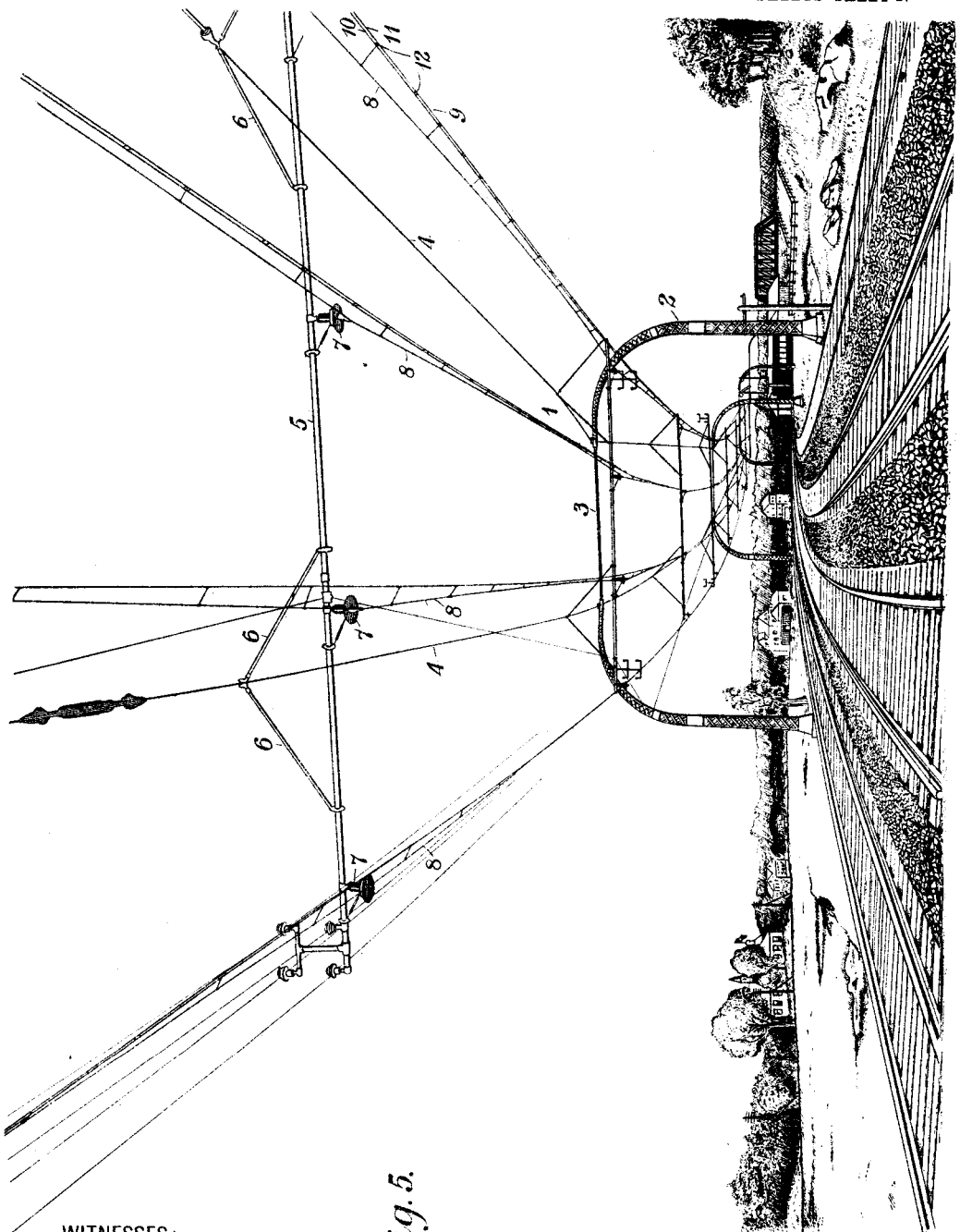

W. S. MURRAY.
OVERHEAD LINE STRUCTURE FOR ELECTRIC RAILWAYS.
APPLICATION FILED JUNE 9, 1910.
1,055,782.
Patented Mar. 11, 1913.
2 SHEETS—SHEET 1.
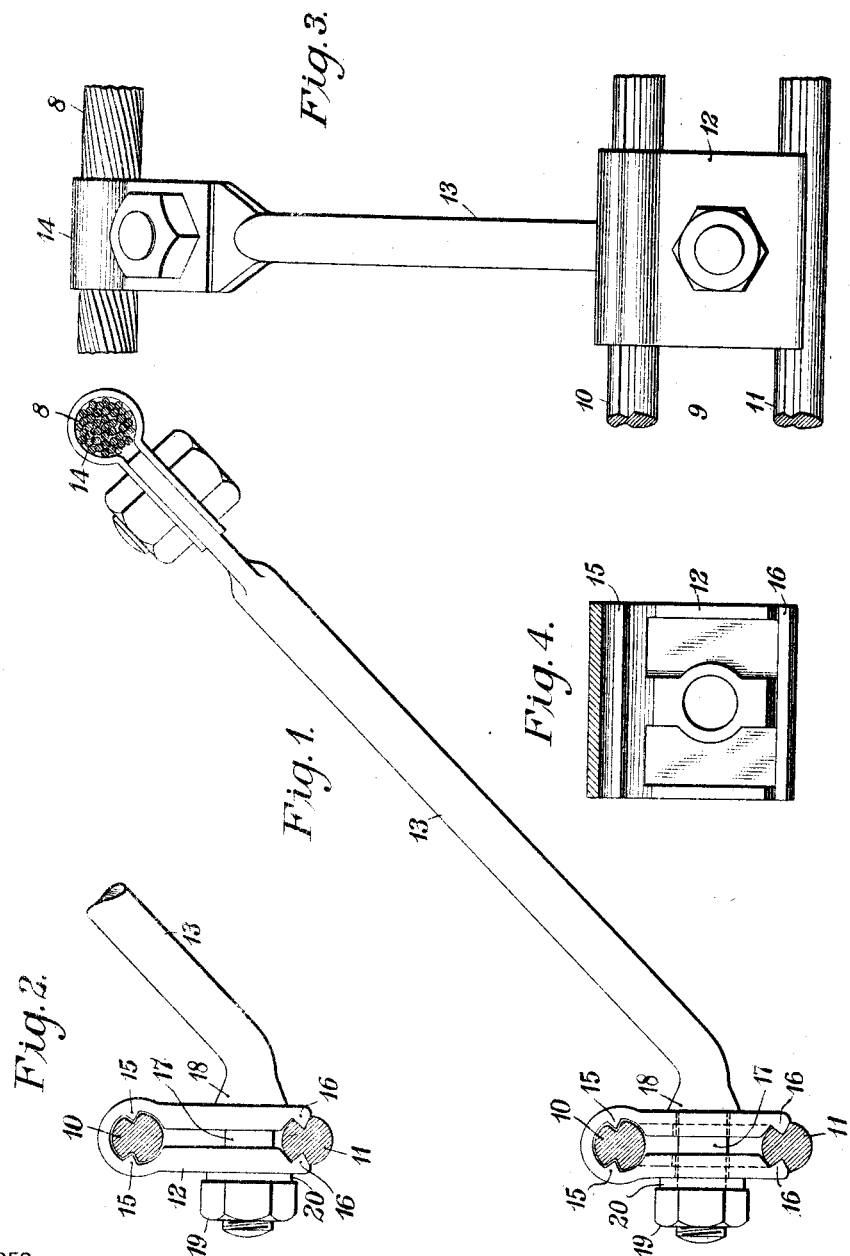

W. S. MURRAY.
OVERHEAD LINE STRUCTURE FOR ELECTRIC RAILWAYS.
APPLICATION FILED JUNE 9, 1910.

1,055,782.

Patented Mar. 11, 1913.
2 SHEETS—SHEET 2.

WITNESSES:
C. L. Belcher
D. H. Mace

INVENTOR
William S. Murray
BY
Hsley E. Carr
ATTORNEY

UNITED STATES PATENT OFFICE.

WILLIAM S. MURRAY, OF NEW HAVEN, CONNECTICUT, ASSIGNOR TO WESTINGHOUSE ELECTRIC AND MANUFACTURING COMPANY, A CORPORATION OF PENNSYLVANIA.

OVERHEAD-LINE STRUCTURE FOR ELECTRIC RAILWAYS.

1,055,782.     Specification of Letters Patent.     Patented Mar. 11, 1913.

Application filed June 9, 1910. Serial No. 566,104.

*To all whom it may concern:*

Be it known that I, WILLIAM S. MURRAY, a citizen of the United States, and a resident of New Haven, in the county of New Haven and State of Connecticut, have invented a new and useful Improvement in Overhead-Line Structures for Electric Railways, of which the following is a specification.

My invention relates to electrically operated railways and particularly to overhead structures for use upon curved sections of such railways to supply energy to the propelling motors of the locomotives or other propelling vehicles.

It has become a usual practice to equip electrically operated railways with catenary overhead line structures, particularly when such railways are utilized for heavy traffic and high speed service. It is the ordinary practice, where single messenger cables and single trolley conductors are utilized, to suspend the trolley conductors from messenger cables by means of suitable vertically disposed hangers and to utilize pull-off wires at curves, in order to maintain the trolley conductors substantially above the center lines of the tracks, in connection with which they are used. In certain cases where provision for heavy traffic and high speed service has been necessary, two parallel conductors have been suspended, one above the other, from a messenger cable, the two being fastened together at frequent intervals by means of suitable clips and the lower conductor, with which the trolley makes direct contact, has been made of steel and the upper conductor of copper, in order to utilize effectively the better wearing qualities of steel and the better conductivity of copper. In the case of a straight section of road equipped with parallel conductors, as above mentioned, it has been found satisfactory to suspend the copper conductor directly from the messenger cable by means of suitable hangers, but, in the case of curves, difficulty has been experienced by reason of the tendency of the two parallel conductors to become distorted from their proper relative positions. In practical service, the parallel conductors are subjected to very considerable tensile strains, and, if pull-off or laterally disposed suspension devices are attached directly to the upper conductors, the horizontal components of the forces exerted upon the two conductors are such that a considerable lateral displacement from the desired vertical relation will be effected.

It is the object of my invention to simplify the suspension-retaining means for parallel trolley conductors at curves and also to so utilize the suspension-retaining means that the two conductors shall always be maintained in the desired relation to each other, the forces being so applied and balanced that the desired condition is uniformly maintained.

In the accompanying drawing, Figure 1 is a side elevation of one of my devices for suspending parallel conductors from a messenger cable at curves, the two conductors and cable being shown in section. Fig. 2 is a view similar to Fig. 1 but showing only a portion of the curve hanger and showing a different relation between the hanger arm and the conductor clip. Fig. 3 is a view of the parts shown in Fig. 1, at right angles to the said figure. Fig. 4 is a sectional side elevation of the clip shown in the preceding figures. Fig. 5 is a perspective view of a curved section of a four track railway having an overhead structure which embodies my invention.

As shown in Fig. 5, of the drawings, the overhead catenary lines 1 for the four track road there illustrated are all supported by a series of curved steel towers 2 which project inward over the tracks, the upper inner ends of which are connected by a suitable frame work 3 and support two main cables 4. From the main cables 4 are suspended, at intervals, laterally disposed rods or bars 5 by means of hangers 6, and on the bars 5 are mounted insulators 7 for the respective messenger cables 8. From each messenger cable is suspended a double trolley conductor 9, the two members 10 and 11 of which are fastened together by clips 12 some or all of which are utilized in connection with my special hanger rods for sustaining the conductors in proper relation upon curved sections of the railway, the details of the curve-sustaining devices being illustrated in Figs. 1 to 4, inclusive, to which specific reference may now be had. The hanger rod 13, is indicative of a large number of such devices which are employed and which are of different lengths, according to the positions on the curve which they occupy. The upper end of the hanger rod 13 is provided with a suitable messenger cable clamp 14 of usual construction and its body portion is disposed at an angle of approximately forty-five degrees to the vertical; as shown in Fig. 1. The clips 12 for connecting the copper conductor 10 and the steel conductor 11 together in the desired relation are here shown as of U shape and as having inner projections 15 at the upper closed portion which engage suitable grooves in the copper conductor and as having similar projections 16 at their free ends to engage grooves in the sides of the steel conductor. The two arms of the clip are clamped together by suitable bolts and nuts, in case they are employed solely for spacing the conductors 10 and 11 from each other, but, when used upon curves, the lower end 17 of the inclined hanger rod 13 is bent at such angle to the body portion as to be substantially horizontal and is provided with a shoulder 18 which abuts against one side of the clip, the other end of the horizontal portion 17 being screw-threaded and provided with a nut 19 and a split washer 20 so that the conductors 10 and 11 may be securely clamped to the end of the hanger rod.

In case the tension upon the steel conductor is the same as that upon the copper conductor, the horizontal part 17 of the hanger will be located midway between the two conductors, as indicated in Fig. 1, but, in case the tension upon the steel conductor is greater than that upon the copper conductor, which is sometimes desirable, the horizontal portion of the hanger will be located nearer to the steel conductor than to the copper conductor, as indicated in Fig. 2. Obviously, if the tension upon the copper conductor were greater than that upon the steel conductor, the horizontal portion of the hanger rod would be located nearer to the copper conductor, the relation of parts being such that the distance between the point at which the hanger is attached to the clip and the center of the steel wire is to the distance between said point and the center of the copper wire as the tension upon the copper wire is to the tension upon the steel wire, in order that the leverage forces may be balanced.

It will be understood from the foregoing description that parallel trolley conductors are suspended from the messenger cable and maintained in proper relation to each other, upon curves, by means of a single set of hanger rods.

I claim as my invention:

1. An overhead curve structure for electric railways, comprising a messenger cable, two parallel conductors connected together by clips and disposed below and at one side of said cable, and inclined hanger rods having their respective ends clamped to the messenger cable and to the conductor clips between the conductors.

2. A pull-off hanger for curved double trolley conductors, comprising a body portion, a messenger cable clamp at one end, a clip for the two trolley conductors and means for fastening the other end of the hanger rod to the clip between the conductors.

3. In an overhead structure for electric railways, a messenger cable, two conductors disposed one above the other, clips for fastening said conductors in parallel relation and hanger rods clamped at their respective ends to the clips between the conductors and to the messenger cable.

4. A combined hanger and pull-off device for double trolley conductors, comprising a clip for said conductors, an inclined hanger rod having a messenger cable clamp at one end and a trolley conductor clamp at the opposite end, the lower end of the hanger rod being so located between the trolley conductors as to maintain them in normal relation.

5. An overhead curve structure for electric railways comprising a messenger cable, supporting means therefor, two trolley conductors disposed the one above the other, clips for holding said conductors in parallel relation, inclined rods of different lengths having their upper ends clamped to the messenger cable and their lower ends fastened to said clips at such points between the conductors as to equalize the forces which tend to distort the conductors.

6. In an overhead structure for curved sections of electric railways, the combination with a messenger cable and supports therefor, of two conductors disposed one above the other at one side of and below the messenger cable, clips for maintaining said conductors in parallel relation, and inclined hanger rods of different lengths interposed between the messenger cable and some of said clips, the distances between the lower end of each hanger rod and the respective conductors being in inverse ratio to the tensile strains upon said conductors.

7. A combined pull-off and hanger for curved double trolley conductors comprising a clip for said conductors, and a rod having a messenger cable clamp at one end and a laterally bent opposite end located between the conductors and provided with means for locking the clip in position.

8. A combined pull-off and hanger for trolley conductors comprising a rod having a laterally bent end, devices coöperating with said laterally bent end to clamp a trolley conductor directly thereto and a messenger cable clamp coöperating with the opposite end of said rod.

9. A combined pull-off and hanger for double trolley conductors comprising a rod having a messenger cable clamp at one end and a laterally bent opposite end, and means coöperating with said laterally bent end to clamp a double trolley conductor directly thereto.

In testimony whereof, I have hereunto subscribed my name this 20th day of May 1910.

WM. S. MURRAY.

Witnesses:
    BENJAMIN I. SPOCK,
    M. G. REYNOLDS.